(12) United States Patent
Fourney et al.

(10) Patent No.: US 9,150,394 B2
(45) Date of Patent: Oct. 6, 2015

(54) APPARATUS AND METHODS FOR HELPING UNLOAD A PALLET

(75) Inventors: Matthew L. Fourney, Laurel, MD (US); Stephen Wargo, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 2007 days.

(21) Appl. No.: 12/132,748

(22) Filed: Jun. 4, 2008

(65) Prior Publication Data

US 2009/0301357 A1   Dec. 10, 2009

(51) Int. Cl.
 *B66F 9/16* (2006.01)
 *B66F 7/08* (2006.01)
 *B65G 59/08* (2006.01)
 *B66F 7/06* (2006.01)

(52) U.S. Cl.
 CPC . *B66F 7/08* (2013.01); *B65G 59/08* (2013.01); *B66F 7/0666* (2013.01); *B66F 7/0683* (2013.01)

(58) Field of Classification Search
 None
 See application file for complete search history.

(56) References Cited

U.S. PATENT DOCUMENTS

| | | | |
|---|---|---|---|
| 5,400,720 A * | 3/1995 | Stevens | 108/147 |
| 5,538,389 A | 7/1996 | Stone | |
| 5,601,014 A | 2/1997 | Stevens et al. | |
| 5,829,948 A * | 11/1998 | Becklund | 414/607 |
| 6,079,544 A | 6/2000 | Donati et al. | |
| 6,547,509 B1 | 4/2003 | Edmo | |
| 2007/0140817 A1 * | 6/2007 | Hansl | 414/277 |

FOREIGN PATENT DOCUMENTS

JP   8-277029 A1   10/1996

OTHER PUBLICATIONS

ECOA Industrial Products, "Hydraulic Lift Tables-Scissor Lifts, Ergonomic Lift Tables & Ergonomic Lift Equipments," Web page: www.ecoalifts.com, copyright 2004, ECOA Industrial Products, Medley, Florida.

* cited by examiner

*Primary Examiner* — Saul Rodriguez
*Assistant Examiner* — Willie Berry, Jr.
(74) *Attorney, Agent, or Firm* — James T. Cronvich

(57) ABSTRACT

A tiltable lift and a method for using it to aid the unloading of a pallet. The tiltable lift comprises a lift mounted atop a tiltable platform. A pallet load of pallet load elements, such as containers, cartons, boxes, trays, or bundles, deposited on the lift is tilted. A wall extending upward from the platform receives a side of the tilted pallet load, which is urged against the wall by gravity. The lift lifts the pallet load along the wall to position the topmost layer of the pallet load at a top end of the wall for easy access and removal of pallet load elements from the pallet.

27 Claims, 3 Drawing Sheets

APPARATUS AND METHODS FOR HELPING UNLOAD A PALLET

BACKGROUND

The invention relates generally to lifts and tiltable supports and, more particularly, to lifts mounted on tiltable supports and associated methods for removing boxes, trays, bundles of articles, or other pallet load elements from a pallet.

A typical pallet load comprises a multi-layer array of containers, such as boxes or trays, stacked atop a pallet. The containers are often removed manually from the pallet one by one starting with the topmost layer. Containers in the topmost layer closest to the point of removal are easy to remove. But containers farther away from the point of removal are hard to reach.

SUMMARY

This problem is solved by an apparatus for unloading a pallet embodying features of the invention. One version of such an apparatus comprises a tiltable platform and a lift. The platform supports a multi-layer pallet load. The lift is positioned between the platform and the pallet load to lift the pallet load upward away from the platform. A wall extends upward from a side of the platform to a top end. The wall provides a surface against which the pallet load is registered by gravity when the platform is in a tilted position and along which the pallet load advances when lifted by the lift.

Another version of the apparatus comprises a platform tiltable from a horizontal position to a tilted position. A wall extends upward from an edge of the platform to a distal top end. The wall is tiltable with the platform to support the side of a pallet load. A lift supported on the platform tilts with the platform and advances the pallet load along the wall and away from the platform.

In another aspect of the invention, a method for unloading pallet load elements from a pallet is provided. The method comprises: (a) depositing a pallet load, comprising multiple layers of pallet load elements, atop a lift; (b) tilting the lift to tilt the pallet load off vertical; (c) supporting a side of the tilted pallet load with a restraint; (d) extending the lift to advance the pallet load along the restraint until the topmost pallet layer is at an upper end of the restraint; (e) removing the pallet load elements from the topmost layer over the upper end of the restraint; and (f) repeating step (d) to push the new topmost layer to the upper end of the restraint for removal.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
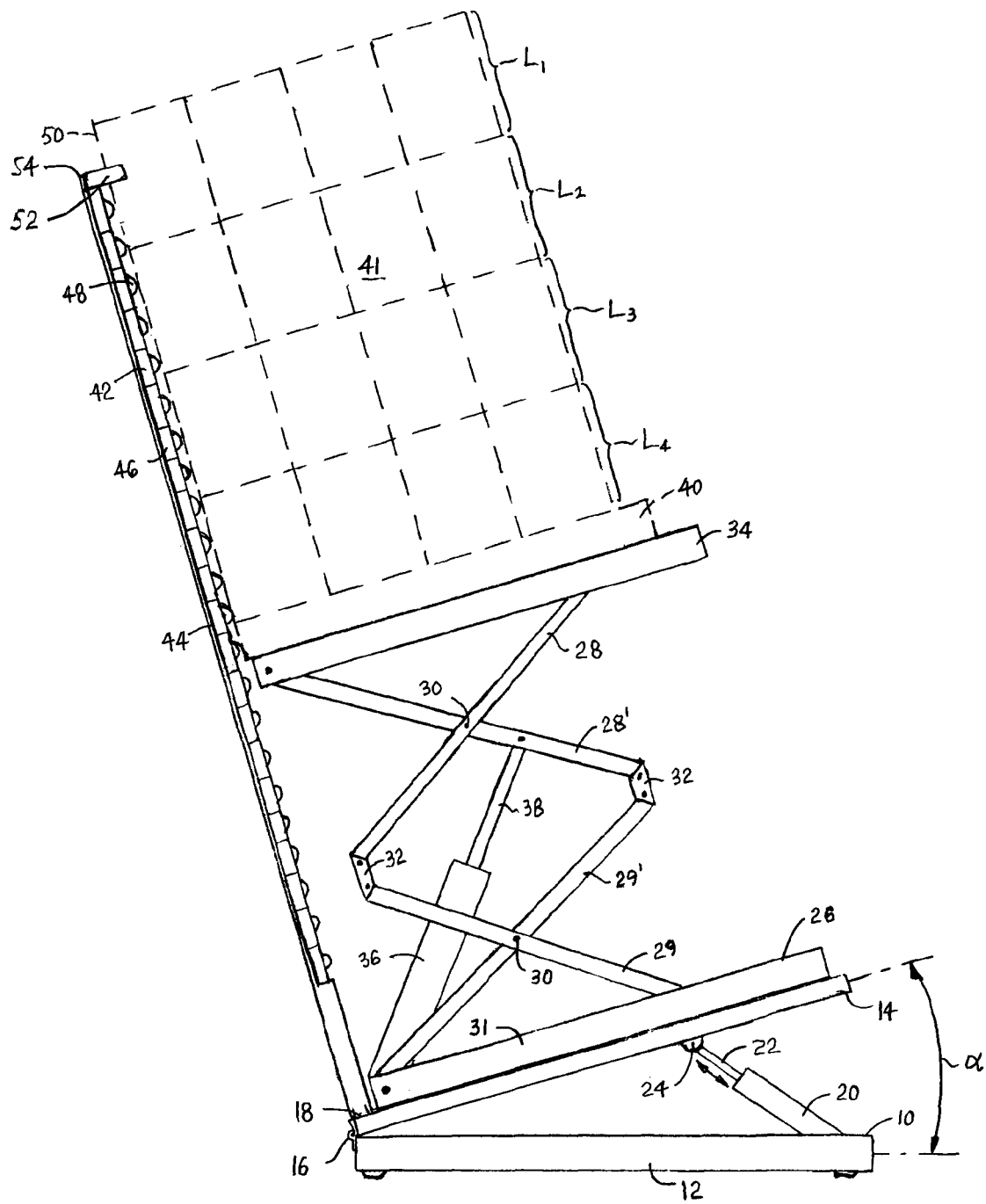
FIG. 1 is a side elevation view of one version of an apparatus embodying features of the invention for helping unload a pallet.

FIG. 1 shows an apparatus that helps unload a pallet load. The apparatus includes a tilter 10, such as one of those manufactured and sold by Vestil Manufacturing Corp. of Angola, Ind., U.S.A. The tilter has a base 12 to which a platform 14 is attached at a hinge 16 at first edge 18 of the platform. A hydraulic cylinder 20 is pivotally attached to the base at one end. A piston rod 22 at the other end is attached to the platform at a pivot 24. When the piston rod is completely retracted, the platform is horizontal. The extension of the rod determines the tilt angle α of the platform.

A lift 26, in the form of a scissor lift, such as one of those sold by Dumpers Unlimited of Bailey, Mich., U.S.A., is mounted to the tiltable platform. The scissor lift shown is a two-stage lift with two pairs of crossing legs 28, 28', 29, 29', joined at scissor pivots 30 and supported in a base 31. The legs in each pair are joined at knee joints 32. The lower inner leg 29' is pivotally affixed to the base 31. The lower outer leg 29 is pivotally attached to a wheel (not shown) or other slidable mount that can translate along the base as the lift is being extended or retracted. A table 34 forms a top support surface of the lift. The upper inner leg 28' is pivotally affixed to the underside of the table. The upper outer leg 28 is pivotally attached to a slidable mount (not shown). The lift is actuated by a hydraulic cylinder 36 pivotally attached to the base 26 at one end. A piston rod 38 at the other end is pivotally attached to the upper inner leg 28'.

A pallet 40 rests on the lift table 34. A multi-layer pallet load 41, comprising an arrangement of pallet load elements, such as containers, boxes, packages, cartons, trays, or bundles of mail, is supported on the pallet. The pallet load in this example has four layers $L_1$-$L_4$, where $L_1$ is the topmost layer.

A wall 42 extends upward from the lower edge of the tilted platform 14 of the tilter 10. The wall includes a support frame 44 backing an array 46 of rollers 48. One example of the roller array forming the wall is a modular roller-top conveyor belt mat, such as one of those manufactured and sold by Intralox, L.L.C. of Harahan, La., U.S.A. The modular belt mat is constructed of rows of conveyor belt modules linked side to side and end to end at joints between adjacent rows. Rollers on the belt are rotatable in the upward direction along the wall. Because of the rolling contact provided by the rollers, the wall serves as a low-friction restraining surface for the downwardly tilted side 50 of the pallet load. The wall prevents the pallet load from falling off the tilted table 34. The rollers allow the pallet load to advance easily as it bears against the rollers when the pallet is being lifted. This prevents scuffing or marring of labels on pallet load elements as well.

Figure 2:
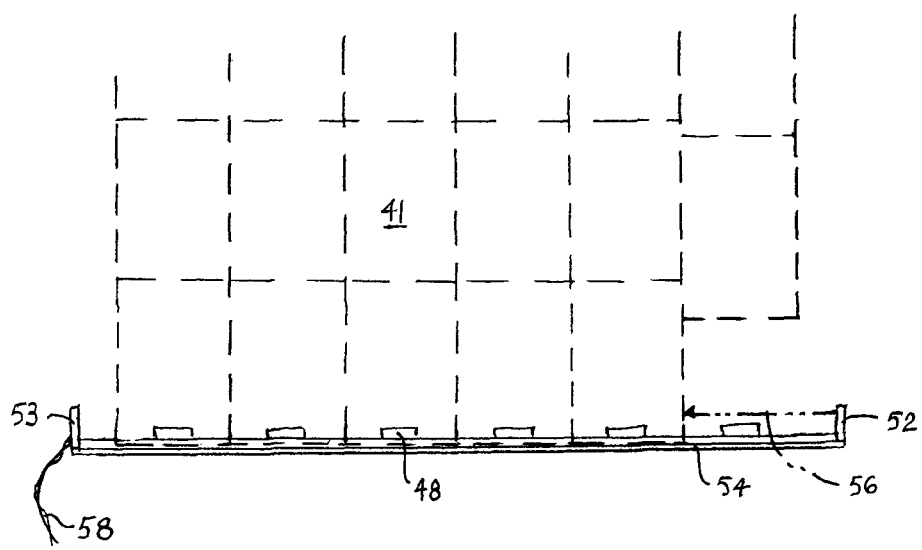
FIG. 2 is a top plan view of a portion of the apparatus of FIG. 1.

A sensor, such as an optical transmitter 52 and a receiver 53, are mounted at the distal top end 54 of the wall. As shown in FIG. 2, the optical transmitter transmits a light beam 56 from the right side of the top end of the wall towards the receiver at the left side along a path parallel and close to the confronting face of the wall. In this way, the sensor senses the presence of pallet load elements, such as trays, in the topmost layer. The light beam is positioned close to the wall because the tilt of the pallet load causes trays in the topmost layer to slide by gravity along the top of the next lower layer as in the topmost layer at the wall are removed. So, as long as at least one remains in the topmost layer, a tray should be in a position blocking the light beam. Once the final tray is removed from the topmost layer, the unoccluded light beam traverses the entire width of the wall and is received by the optical receiver, which sends a signal on signal wires 58 to activate the lift to advance the pallet layers to position the succeeding layer at the top end of the wall. The amount of advancement is preferably fixed to be the height of the pallet layers. But, in a closed-loop arrangement, the interruption of the light beam by the new topmost layer could be used to signal the lift to stop its advance.

One method of unloading a pallet layer using an apparatus like that shown in FIGS. 1 and 2 is shown in FIGS. 3A-3D. This apparatus differs from the previous version in that it has a wall 60 realized as a belt loop 62 trained around a pair of divert sprockets or rollers 64, 65. The outer face 66 of the belt facing the pallet load presents a generally planar surface to receive the tilted pallet load. Both rollers may be idle rollers so that, as the pallet load is lifted, the belt advances along the rollers with the advance of the pallet load by contact. One of the divert rollers, such as the bottom roller 65, could be a powered roller driven by an internal or external motor in synchrony with the actuation of the lift to help lift the pallet load. By moving with the pallet load, both versions, powered and unpowered, effectively present a low-friction restraining surface to the pallet load.

Figure 3A:
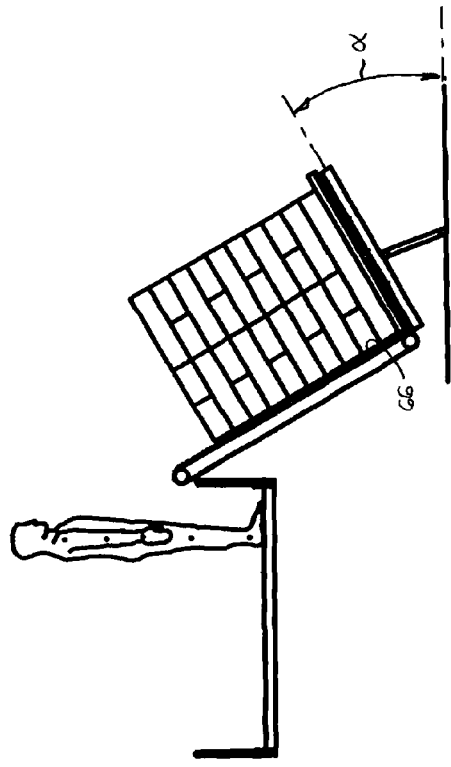
FIGS. 3A-3D are side elevation views of another version of an apparatus as in FIG. 1 showing its operation.
Figure 3B:
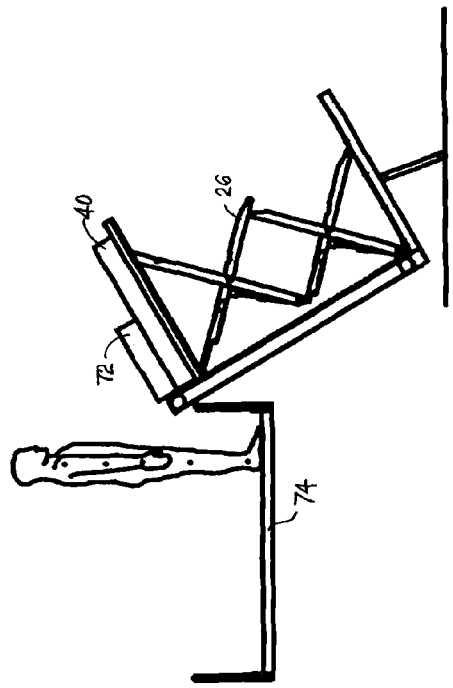
Figure 3C:
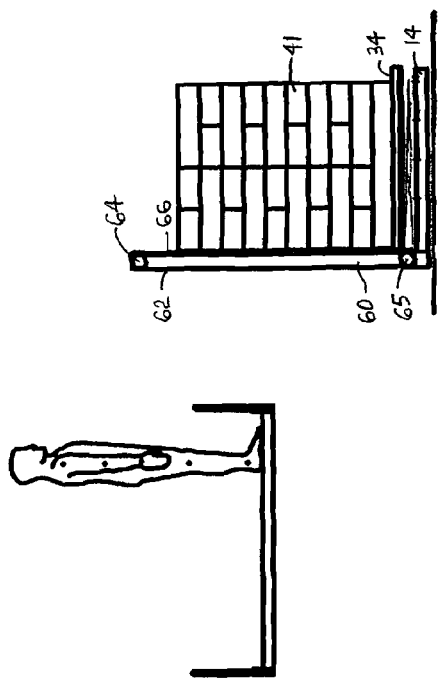
Figure 3D:
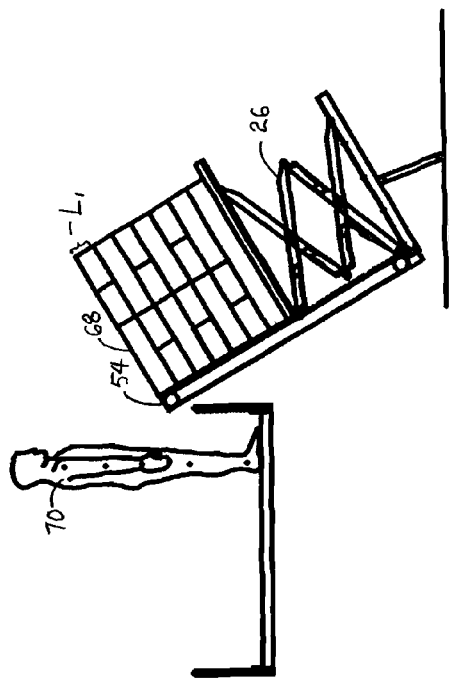

The operational sequence begins in FIG. 3A with a pallet load 41 deposited atop the retracted lift's table 34 while the tilt platform 14 is in the horizontal position. As shown in FIG. 3B, the tilter 12 is activated to tilt its platform and, consequently, the lift and the pallet load at an angle α. When the pallet load is tilted, the load is urged by gravity against the supporting surface 66 of the wall, which serves as a restraint to the pallet load. As shown in FIG. 3C, the lift 26 is then activated to push the pallet load upward toward the top end 54 of the wall. In a preferred scheme, the lift stops when the top 68 of the topmost layer $L_1$ of the pallet load extends above the top end of the wall for easy access by an operator 70. But the lift could be operated to stop when the top layer is at a level convenient for an operator to reach, even if the top of the top layer is below the top end of the wall. The operator, shown standing on an elevated platform 74, manually removes pallet load elements, such as trays, from the topmost layer over the top end of the wall. The action of gravity on the trays in the topmost layer urges them toward the wall as leading trays are removed. In this way, the operator does not have to lean across the pallet layers to reach the far trays. For manual removal of the trays, the layers are lifted so that the bottom of the topmost layer is below the top end of the wall, which acts as a lip to retain the trays. But the lift could also be used for automatic removal by lifting the layers until the bottom of the topmost layer clears the top end of the wall and is automatically discharged over the top end by gravity onto an unloading device. As shown in FIG. 3D, the lift 26 continues to advance the pallet load and stop it as layers are removed. Once the last tray 72 of the last layer is removed from the pallet 39, the lift is retracted and the tilter's platform is returned to its horizontal position for removal of the pallet 40 before another pallet load is deposited on the tiltable lift.

Although the invention has been described with reference to a few preferred versions, other versions are possible. For example, the wall could be realized as a flat stationary wall, perhaps made of a slick hard plastic or other material, that has a relatively low coefficient of friction for easy sliding. As another example, the operator could use a manual lift control to activate the lift to position the pallet load as required, instead of using the topmost-layer position sensor. And sensors other than the optical sensors described could be used to determine the complete removal of a pallet layer. For example, limit switches positioned along the top end of the wall could be used to react to the pressure of pallet load elements with a signal indicating the complete removal of the layer. As yet another example, the lift could be realized as other than a scissor lift. A lift table pushed directly by a piston rod or by a telescoping rod or any other conventional lift mechanism could be used in the tiltable lift of the invention. So, as these few examples suggest, the scope of the invention is not meant to be limited to the preferred version described in detail.

What is claimed is:

1. Apparatus for unloading a pallet, comprising:
a tiltable platform for supporting a pallet load of multiple layers;
a lift disposed between the platform and the pallet load to lift the pallet load upward away from the platform;
a wall extending upward from a side of the platform to a top end and having a low-friction surface against which the pallet load is registered by gravity when the platform is in a tilted position and along which the pallet load advances when lifted by the lift.

2. Apparatus as in claim 1 wherein the lift is a scissor lift.

3. Apparatus as in claim 1 wherein the wall comprises a planar surface made of a low-friction material.

4. Apparatus as in claim 1 wherein the wall comprises an unpowered conveyor belt.

5. Apparatus as in claim 1 wherein the wall comprises a powered conveyor belt.

6. Apparatus as in claim 1 wherein the wall comprises a plurality of rollers.

7. Apparatus as in claim 1 wherein the wall comprises a modular conveyor mat having a plurality of rollers against which the pallet layers bear.

8. Apparatus as in claim 1 wherein the lift is selectively activated to lift the pallet load in steps equal to the height of a single pallet layer.

9. Apparatus as in claim 1 wherein the lift is selectively activated to lift the pallet load so that the top of the top pallet layer extends upward past the top end of the wall.

10. Apparatus as in claim 1 wherein the lift is selectively activated to lift the pallet load so that the top end of the wall is below the bottom of the topmost pallet layer.

11. Apparatus as in claim 1 wherein the lift is selectively activated to lift the pallet load so that topmost pallet layer is within reach of an operator.

12. Apparatus as in claim 1 further comprising a sensor responsive to the unloading of the entire topmost pallet layer and providing a signal to the lift to lift the next pallet layer to the top end of the wall to be unloaded.

13. Apparatus for unloading a pallet, comprising:
a platform tiltable from a horizontal position to a tilted position;
a wall having a low-friction surface extending upward from an edge of the platform to a distal top end and tiltable with the platform to support the side of a pallet load;
a lift supported on the platform to tilt with the platform and advance the pallet load along the wall and away from the platform.

14. Apparatus as in claim 13 wherein the lift is a scissor lift.

15. Apparatus as in claim 13 wherein the wall comprises a planar surface made of a low-friction material.

16. Apparatus as in claim 13 wherein the wall comprises an unpowered conveyor belt.

17. Apparatus as in claim 13 wherein the wall comprises a powered conveyor belt.

18. Apparatus as in claim 13 wherein the wall comprises a plurality of rollers.

19. Apparatus as in claim 13 wherein the wall comprises a modular conveyor mat having a plurality of rollers along which the side of the pallet load rolls while being lifted.

20. Apparatus as in claim 13 wherein the lift is selectively activated to lift the pallet load in steps equal to the height of a single pallet layer.

21. Apparatus as in claim 13 wherein the lift is selectively activated to advance the pallet load so that the top end of the wall is between the top and the bottom of the topmost pallet layer.

22. Apparatus as in claim 13 wherein the lift is selectively activated to advance the pallet load so that the top end of the wall is below the bottom of the topmost pallet layer.

23. Apparatus as in claim 13 further comprising a sensor responsive to the unloading of the entire topmost pallet layer and providing a signal to the lift to lift the next pallet layer to the top end of the wall to be unloaded.

24. A method for unloading pallet load elements from a pallet, the method comprising:
   (a) depositing a pallet load, comprising multiple layers of pallet load elements, atop a lift;
   (b) tilting the lift to tilt the pallet load off vertical;
   (c) supporting a side of the tilted pallet load with a low-friction restraint;
   (d) extending the lift to advance the pallet load along the restraint until the topmost pallet layer is at an upper end of the restraint;
   (e) removing the pallet load elements from the topmost layer over the upper end of the restraint;
   (f) repeating step (d) to push the new topmost layer to the upper end of the restraint for removal.

25. The method of claim 24 further comprising, between steps (e) and (f):
   sensing the removal of the entire topmost layer.

26. The method of claim 24 further comprising:
   catching pallet load elements in the topmost layer with the restraint as they slide by gravity toward the restraint when other pallet load elements from the topmost layer are removed.

27. The method of claim 24 wherein step (d) comprises:
   extending the lift to advance the pallet load along the restraint until the topmost pallet layer is at an upper end of the restraint with the bottom of the topmost layer above the upper end of the restraint for automatic removal of the pallet elements.

* * * * *